United States Patent
Indukuru et al.

(10) Patent No.: US 10,169,187 B2
(45) Date of Patent: Jan. 1, 2019

(54) PROCESSOR CORE HAVING A SATURATING EVENT COUNTER FOR MAKING PERFORMANCE MEASUREMENTS

(75) Inventors: Venkat Rajeev Indukuru, Austin, TX (US); Alexander Erik Mericas, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 861 days.

(21) Appl. No.: 12/858,497

(22) Filed: Aug. 18, 2010

(65) Prior Publication Data
US 2012/0046912 A1    Feb. 23, 2012

(51) Int. Cl.
G06F 11/34    (2006.01)

(52) U.S. Cl.
CPC ........ *G06F 11/348* (2013.01); *G06F 2201/88* (2013.01)

(58) Field of Classification Search
CPC ............................ G06F 11/348; G06F 2201/88
USPC ......................................... 702/182, 186, 189
See application file for complete search history.

(56) References Cited

U.S. PATENT DOCUMENTS

| | | |
|---|---|---|
| 5,557,548 A | 9/1996 | Gover et al. |
| 5,657,253 A | 8/1997 | Dreyer et al. |
| 5,796,637 A | 8/1998 | Glew et al. |
| 6,112,318 A | 8/2000 | Jouppi et al. |
| 6,154,857 A | 11/2000 | Mann |
| 6,233,531 B1 | 5/2001 | Klassen et al. |
| 6,275,782 B1 | 8/2001 | Mann |
| 6,351,724 B1 | 2/2002 | Klassen et al. |
| 6,360,337 B1 | 3/2002 | Zak et al. |
| 6,546,359 B1 | 4/2003 | Week |
| 6,678,777 B2 | 1/2004 | Rao et al. |
| 6,792,392 B1 | 9/2004 | Knight |
| 6,804,770 B2 * | 10/2004 | Logan et al. .................. 712/215 |
| 6,898,261 B1 * | 5/2005 | Hunter et al. ................... 377/15 |
| 7,069,426 B1 * | 6/2006 | Hummel ....................... 712/240 |
| 7,284,158 B2 | 10/2007 | Hunter et al. |

(Continued)

OTHER PUBLICATIONS

May, John M. , "MPX: Software for Multiplexing Hardware Performance Counters", IPDPS Proceedings 2001.

(Continued)

*Primary Examiner* — Mischita Henson
(74) *Attorney, Agent, or Firm* — Mitch Harris, Atty at Law, LLC; Andrew M. Harris; Joseph J. Petrokaitis

(57) ABSTRACT

A performance monitor including a saturating counter provides a relative measure of event frequency without requiring a minimum polling rate or periodic reset to avoid or account for counter overflow. The saturating counter is incremented upon detection of an event and decremented if an event is not detected within a predetermined period. The period of detecting may be programmable and may be determined by real time clock, processor or instruction cycles. Multiple event types may be selected from for detection and input to a single counter, or alternatively multiple event counters may be provided for various event types. The saturating counter may additionally be periodically reset in a selected operating mode, in combination with the decrementing action performed on the counter.

18 Claims, 5 Drawing Sheets

(56) References Cited

U.S. PATENT DOCUMENTS

| | | | |
|---|---|---|---|
| 7,340,378 B1* | 3/2008 | Floyd | G06F 11/3466 |
| | | | 702/186 |
| 7,475,295 B2* | 1/2009 | Purrington et al. | 714/55 |
| 7,519,510 B2 | 4/2009 | Koehler et al. | |
| 7,533,003 B2 | 5/2009 | Floyd et al. | |
| 7,681,054 B2 | 3/2010 | Ghiasi et al. | |
| 2002/0073255 A1 | 6/2002 | Davidson et al. | |
| 2002/0138713 A1* | 9/2002 | Logan et al. | 712/214 |
| 2004/0123185 A1* | 6/2004 | Pierce et al. | 714/38 |
| 2004/0216113 A1 | 10/2004 | Armstrong et al. | |
| 2004/0236993 A1 | 11/2004 | Adkisson et al. | |
| 2004/0237003 A1 | 11/2004 | Adkisson et al. | |
| 2005/0081101 A1 | 4/2005 | Love et al. | |
| 2005/0155021 A1 | 7/2005 | DeWitt et al. | |
| 2005/0177344 A1 | 8/2005 | Khaleel | |
| 2005/0183065 A1 | 8/2005 | Wolczko et al. | |
| 2005/0246590 A1 | 11/2005 | Lancaster | |
| 2005/0283677 A1 | 12/2005 | Adkisson et al. | |
| 2008/0040634 A1 | 2/2008 | Matsuzaki et al. | |
| 2008/0163254 A1* | 7/2008 | Cota-Robles | G06F 9/45558 |
| | | | 719/318 |

OTHER PUBLICATIONS

Ghiasi, et al., "Scheduling for Heterogeneous Processors in Server Systems", Conf. on Computing Frontiers, pp. 199-210, May 2005.
Kotla, et al., "Scheduling Processor Voltage and Frequency in Server and Cluster Systems", IPDPS 19$^{th}$ Symposium, Apr. 2005.
Kotla, et al., "Characterizing the Impact of Different Memory Intensity Levels", 7$^{th}$ Annual Workshop on Workload Characterization, Oct. 25, 2004.

* cited by examiner

US 10,169,187 B2

PROCESSOR CORE HAVING A SATURATING EVENT COUNTER FOR MAKING PERFORMANCE MEASUREMENTS

BACKGROUND OF THE INVENTION

1. Field of the Invention

The present invention is related to performance measurements in processing systems and processors. In particular, the present invention relates to a processor core having a saturating event counter for making processor performance measurements.

2. Description of Related Art

Performance measurements are used in both system component and software evaluation, as well as in run-time applications such as workload balancing, resource usage accounting and other functions in computer systems in which a measurement of the efficiency or throughput of a workload executing within the computer system is needed. Performance monitoring can be performed in both hardware and software in order to measure and monitor performance of the system. Performance-related events, which may be events indicative of low performance such as cache misses, thread stalls, and the like, or may be events indicative of high performance such as instruction completions or instruction dispatches, can be detected to provide a indication of performance of a system, software or a particular component of a system such as a processor core.

Performance monitors can be implemented using counters that count occurrences of events having a frequency indicative of performance of the computer system. A counter-based event monitoring approach typically requires frequency monitoring of the performance counter count values, so that overflow of the counters and consequent wrap-around due to an occurrence of a large number of performance events is not missed. In such monitors, counter overflow may be allowed to occur and is taken into account, or overflow can be prevented by resetting the counter at a periodic rate that ensures that overflow will not occur, e.g., when the counter is read. However, either of the above-described approaches can lead to an erroneous condition, in which a low count value results when, in fact, a large number of performance events have occurred in the preceding measurement interval. Additionally, typical performance counter implementations do not readily provide information about temporal distributions of performance-related events, as it is difficult to identify when a previous performance-related event occurred in relation to the time of occurrence of another performance-related event.

Therefore, it would be desirable to provide performance monitoring in a computer system that does not require management of counter overflows or that requires periodically resetting the counters.

BRIEF SUMMARY OF THE INVENTION

The above objectives, as well as others, are accomplished in a performance monitoring method and system that use saturating counters to provide an indication of the relative frequency of occurrence of performance related-events. The method may be embodied in a processor core that includes one or more saturating counters that measure the relative rate of internal performance-related event occurrences.

Events indicative of performance within a processor are detected and counted during predetermined intervals. When an event is detected, a saturating counter is incremented. If an event is not detected within the predetermined interval, then the saturating counter is decremented. The saturating counter thereby provides count value that indicates a relative frequency of performance-related events. The saturating counter or counters are then read to obtain a count value from which a relative performance level of the system can be determined.

A saturating counter can be maintained for each of a number of performance event types being detected for performance monitoring purposes. The predetermined period can be determined by a real time clock tick, a processor clock cycle, or by instruction cycles. The saturating counter can be of any bit width and software can read the counter at any time without overflow error. Instruction address and/or data address capture can be performed in response to counter saturation or a particular count level to identify program code sections, data values or time periods associated with a high frequency of performance-related events.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention relates to processors and processing systems in which performance is measured by counting performance-related events, i.e., events indicative of system performance, using a saturating counter. The saturating counter is incremented in response to detecting a performance related event, and is periodically decremented when no event is detected in a preceding period. Performance measurement in accordance with an embodiment of the invention can be used to determine a relative rate of processor performance on a temporal basis. For example, due to the periodic decrementing of the saturating counter, the performance count value will indicate the relative amount of performance-related events that have occurred within a periods of time related to the period of the decrementing. Also, the saturating counter performance counter of the present invention prevents the loss or misrepresentation of performance data that can otherwise result from a conventional performance counter that overflows.

Figure 1:
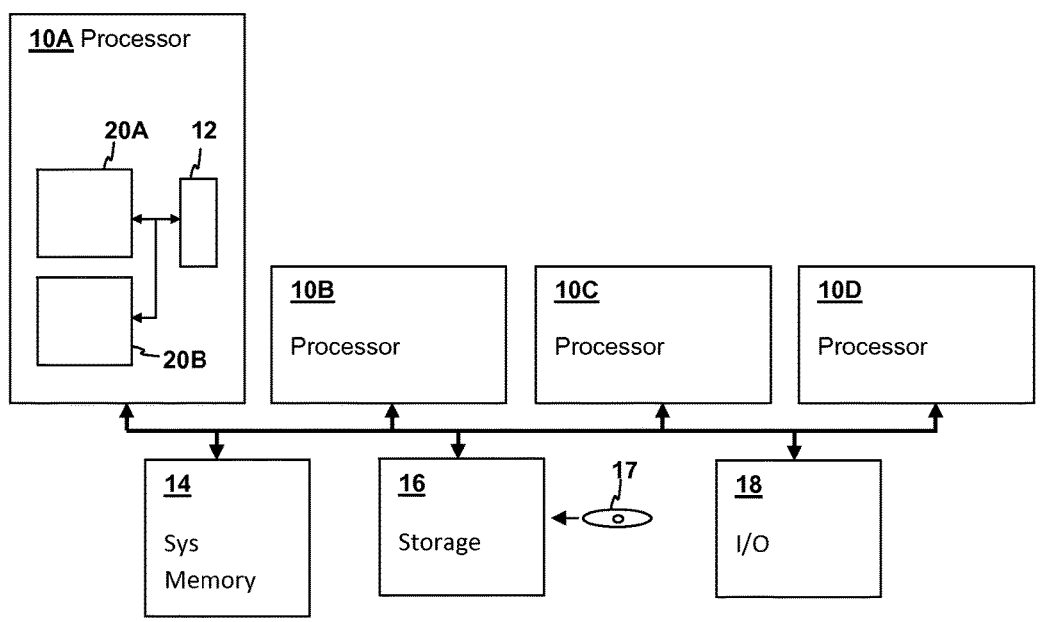
FIG. 1 is a block diagram illustrating a processing system in which techniques according to an embodiment of the present invention are practiced.

Referring now to FIG. 1, a processing system in accordance with an embodiment of the present invention is shown. The depicted processing system includes a number of identical processors 10A-10D, each including performance monitoring features in conformity with an embodiment of the present invention. The depicted multi-processing system is illustrative, and processing systems in accordance with other embodiments of the present invention include uni-processor systems. Processors 10A-10D are identical in structure and include cores 20A-20B and local storage 12, which may be a cache level, or a level of internal system memory. Processors 10A-10D are coupled to main system memory 14, a storage subsystem 16, which includes non-removable drives and optical drives, for reading storage media such as a CD-ROM 17 for loading program code for execution by processors 10A-10D. The illustrated processing system also includes input/output (I/O) interfaces and devices 18 such as mice and keyboards for receiving user input and graphical displays for displaying information. While the system of FIG. 1 is used to illustrate a system in which performance monitoring techniques of the present invention are implemented, it is understood that the techniques of the present invention can be implemented in other architectures and other processors.

Figure 2:
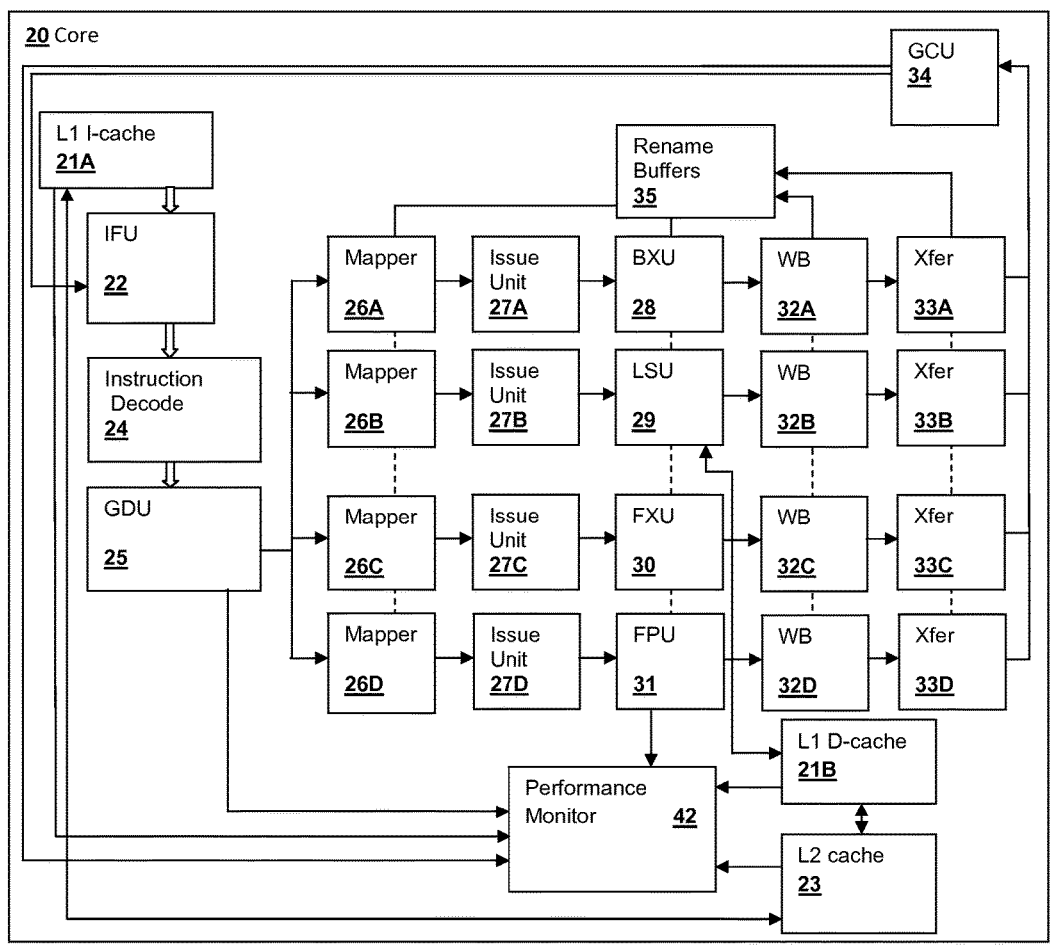
FIG. 2 is a block diagram illustrating details of processor core 20 of FIG. 1.

Referring now to FIG. 2, details of a processor core 20 that can be used to implement processor cores 20A-20B of FIG. 1, are illustrated. Core 20 includes an instruction fetch unit (IFU) 22 that fetches instruction streams from L1 I-cache 21A, which, in turn receives instructions from L2 cache 23. Instructions fetched by IFU 22 are provided to an instruction decode unit 24. A global dispatch unit (GDU) 25 dispatches the decoded instructions to a number of internal processor pipelines. The processor pipelines each include a mapper 26A-26D, an issue unit 27A-27D, an execution unit, one of branch execution unit (BXU) 28, load/store unit (LSU) 29, fixed-point unit (FXU) 30 or floating point unit (FPU) 31, a write back unit (WB) 32A-32D and a transfer unit (Xfer) 33A-33D. A global completion unit (GCU) 34 provides an indication when result transfer is complete to IFU 22. Mappers 26A-2D allocate rename buffers 35 to represent registers or "virtual registers" indicated by instructions decoded by instruction decode unit 24 so that concurrent execution of program code can be supported by the various pipelines. Values in registers located in rename buffers are loaded from and stored to L1 D-cache 21B, which is coupled to L2 cache 23. Out-of-order execution is also supported by the use of rename buffers 35 as the register values are fully virtualized by the action of mappers 26A-26D. WBs 32A-32D write pipeline results back to associated rename buffers 35 and Xfers 33A-33D provide an indication that write-back is complete to GCU 34 so that pipeline results are synchronized with the execution and instruction fetch process.

In illustrated core 20, signals indicative of occurrences of performance-related events are provided to a performance monitor 42. Exemplary events in illustrated core 20 include misses in L1 I-cache 21A, L1 D-cache 21B and L2 cache 23, instruction dispatches by GDU 25, exceptions from FPU 31 and instruction completions from GCU 34. The illustrated event types and associated event signals are only exemplary and other types of events that are indicative of performance may be detected within core 20 and used to provide performance monitor 42 with performance monitoring input. Performance monitor 42 accumulates events according to their occurrence, which may be asynchronous or according to a periodic detection cycle. Performance monitor 42 detects performance-related events and increments a saturating counter according to the number of events detected. Performance monitor 42 also decrements the counter in response to the absence of a performance-related event occurring during a predetermined period. The saturating counter thus provides a temporal indication of performance of the processor in that higher count values will occur during periods of higher event rates. The events may be indicative of desirable performance, or undesirable performance and when multiple event types are combined in a performance monitor result, relative importance is weighted and the negative/positive aspects handled by appropriate sign of the individual contributions. For example, cache misses are generally negative performance events, while instruction dispatches and completions are generally positive performance events.

Figure 3:
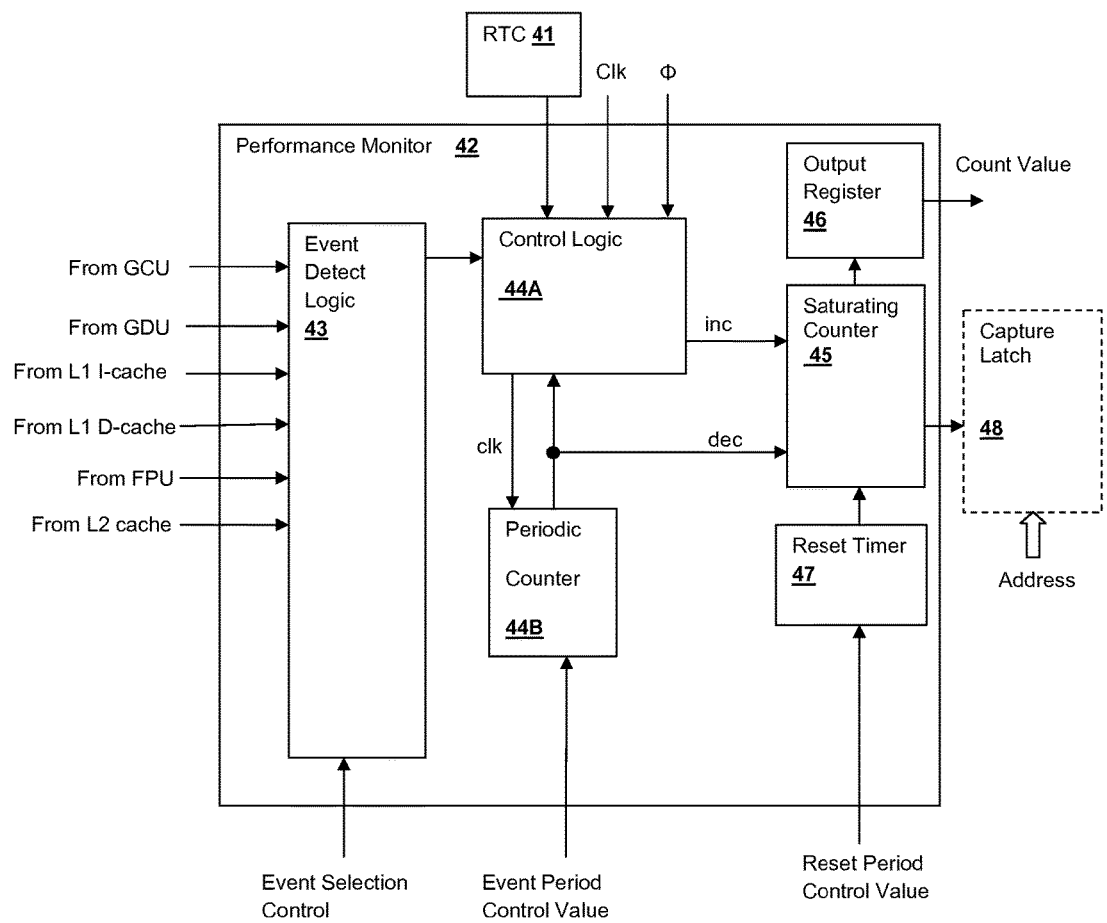
FIG. 3 is a block diagram illustrating details of saturating counter and control circuit 40 of FIG. 2.

Referring now to FIG. 3, details of performance measurement counter 42 are shown, in accordance with an embodiment of the present invention. Performance-related event signals provided from L1 I-cache 21A, GDU 25, FPU 31, GCU 34, L1 D-cache 23B and L2 cache 41, are provided to event detect logic 43, which is generally implemented as combinational logic and receives an event selection control signal which permits selection of event types. Alternatively, or in combination, each event type may be measured separately and have its own associated counter. The output of the event detect logic 43 indicates the detection of performance-related events to control logic 44A. Control logic 44A is also provided a signal from periodic counter 44B, which receives a period control value that sets the predetermined period for decrementing a saturating counter 45, as well as a clock source signal clk from control logic 44A, which can select the clocking source from among a real-time clock (RTC) 41 tick output, a processor clock signal Clk or an instruction cycle (phase) signal $\Phi$. While clocking periodic counter 44B, from a source such as processor clock signal Clk or a RTC tick output provides temporal information about the frequency events, clocking periodic counter 44B from an instruction cycle phase signal $\Phi$ provides information about spatial distribution of events, since the number of instructions completed (and therefore the number of instructions fetched, dispatched, decoded, etc.) strongly correlates to the distance (in address space) of the instruction stream in that a small number of instruction completions indicates a narrow address range. While this assumption is violated under some execution conditions, for example, short loops that may execute a large number of instructions across a small address range, in general the assumption is true and provides useful information about spatial distribution of execution for a resulting count of saturating counter 45. The outputs of control logic 44A and periodic counter 44B are received by saturating counter 45. Saturating counter 45 will increment or decrement in response to signals inc, dec received from 44A and 44B respectively. Saturating counter 45 may saturate by cumulatively receiving more performance event signals from 44A than may be recorded in the count value of saturating counter 44A, in which case the saturating counter remains saturated at its maximum value despite continuing to receive signals to increment the saturating counter in response to events. Conversely the periodic counter 44B may decrement saturating counter 45 to reduce the saturating counter's value to its minimum value, in which case the saturating counter will remain at this minimum value despite continuing to receive periodic signals to decrement. Further saturating counter 45 may provide a trigger output to a capture latch 48 based on a particular count value or saturation of saturating counter 45, that causes saturating counter to capture an instruction address, a data address and/or a data value that may be examined by a monitoring program or otherwise logged. Capture latch 48 may also include multiple storage locations such as a first-in-first-out (FIFO) buffer that can store multiple addresses and/or data values when higher event rates are detected.

Saturating counter 45 may also be reset in response to a reset signal provided from an optional reset timer 47 that has a period set by a period reset value. The output of saturating counter 45 is provided to output register 46, which receives the count value of saturating counter 45 as an output count value, providing read access to the count value of saturating counter either by a memory or I/O mapped register value, or via another access mechanism such as a service control port or scan latch access. The count value output of output register 46 can be used in computing indications of processor workload or performance that can be displayed via a user interface, and as mentioned above, may comprise multiple values associated with multiple event types, provided by multiple corresponding saturating counters 45 that are effectively duplicates of the circuits described above. Control logic 44A may also control reset timer 47 according to a selectable operating mode, such that in a first operating mode, saturating counter is decremented only according to the periodic interval determined by periodic counter 44B, but in another operating mode, reset timer 47 periodically resets saturating counter at a period that is independent of the period of periodic counter 44B, although independence is not a requirement of such an embodiment of the invention, and reset tinier 47, may, for example, have a period that is a multiple of the period of periodic counter 44B.

Figure 4:
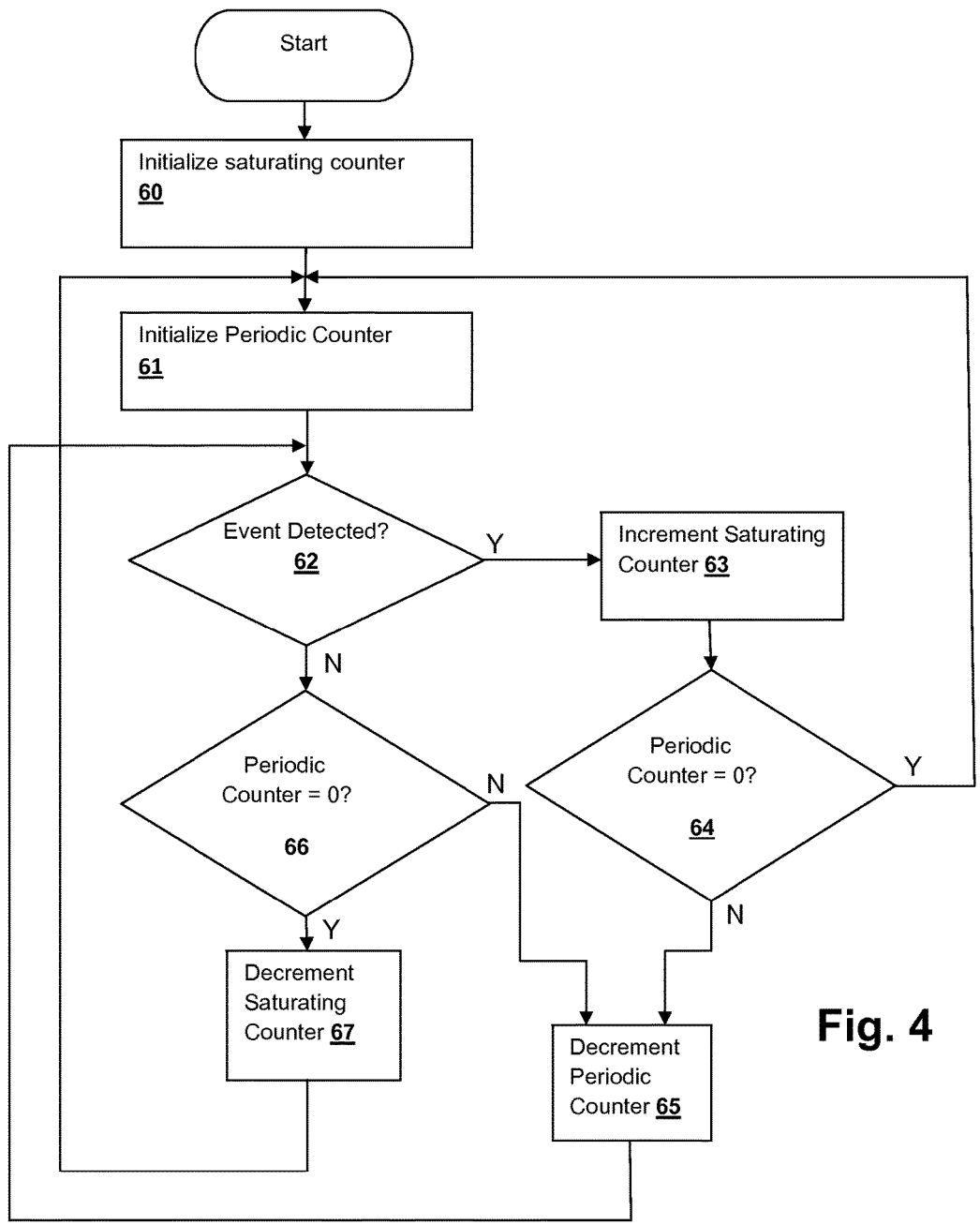
FIG. 4 is a flow chart depicting a method of operation of saturating counter and control circuit 40 of FIG. 2.

Referring now to FIG. 4, a flowchart depicting a method in accordance with an embodiment of the present invention is shown. First, saturating counter 45 is initialized (step 60) and periodic counter 44B is initialized (step 61). If a performance-related event is detected (decision 62), then the saturating counter is incremented (step 63). If the periodic count is equal to zero (decision 64), then the periodic counter is initialized (step 61) and the method continues to count events at decision 62. Otherwise, if the periodic count is not equal to zero (decision 64), the method continues to count events at decision 62. If a performance-related event is not detected (decision 62) and if the periodic count is equal to zero (decision 66), then the saturating counter is decremented (step 67), the periodic counter is initialized (step 61) and the method continues to count events at decision 62. If the periodic count is not equal to zero (decision 66), then the periodic count is decremented (step 65) and the method continues to count events at decision 62. If the periodic count is equal to zero (decision 66), then the saturating counter is decremented (step 67) and the method continues to count events at decision 62.

Figure 5:
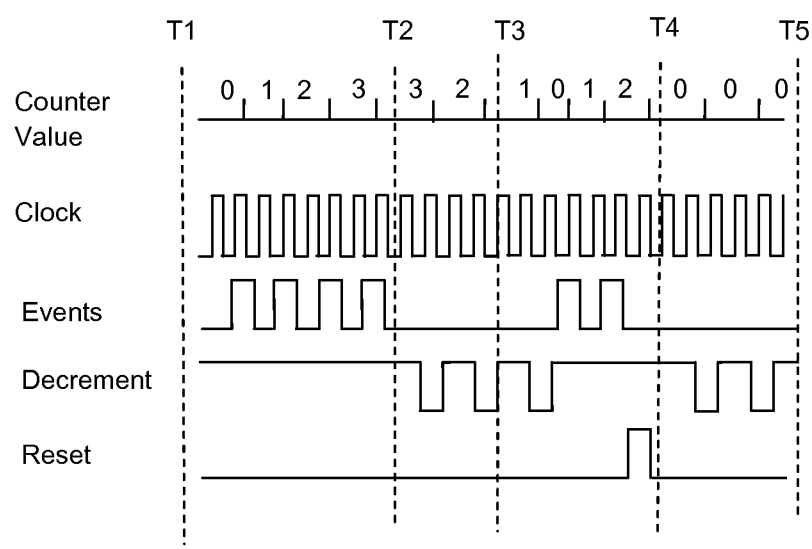
FIG. 5 is a timing diagram depicting signals within saturating counter and control circuit 40 of FIG. 2.

Referring now to FIG. 5, a timing diagram is shown, depicting an example of a method of performance measurement using a saturating counter in accordance with an embodiment of the present invention. The diagram depicts the saturating counter value Counter value of a two bit saturating counter that is incremented when performance-related events occur and decremented periodically, in accordance with an embodiment of the invention. Performance-related events in the diagram occur at a rate no greater than one per period of clock signal Clock, and are indicated as waveform Events. Each performance related event detected, results in the saturating counter incrementing by one. For each two periods of clock signal Clock in which no event occurs, the saturating counter is decremented according to waveform Decrement. The above-described operation results in a saturating counter 45 value that indicates the relative rate of occurrence of performance related-events by increasing the saturating counter 45 value during periods of high event frequency, as illustrated between time T1 and time T2, four performance related events occur causing saturating counter 45 to be incremented four times, saturating at counter value Counter=3. Similarly, saturating counter value Counter decreases during periods of low event frequency, as illustrated by the period between time T2 and time T3, in which no performance-related events occur, causing counter value Counter to be decremented twice. A large number of performance related events within a small unit of time can result in the saturation of the saturating counter 45 at the counter's maximum value, as illustrated by the interval between time T1 and T2, in which three performance related events occur causing the saturating counter 45 to saturate at a maximum value of three. Subsequent performance-related events do not cause either an increase in counter value Counter or a counter overflow. Likewise, an absence of performance related events for an extended time period can result in decrementing counter value Counter to a minimum saturating value, as illustrated by the interval between time T4 and time T5, in which absence of performance related events result in decrementing counter value Counter twice but do not result in decreases in the value of the saturating counter 45 below the value of zero, or otherwise result in the overflow of counter value Counter. As a result, the saturating counter performance monitor of the present invention provides information about relative rates of performance-related events, from which a performance level may be computed from one or more count values. Further, the saturating counter may be independently periodically reset to zero, as between time T3 and time T4, in which Counter Value is reset from two to zero by the Reset signal.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method of monitoring performance of a computer system, the method comprising:
   within a processor core of the computer system, detecting events indicative of the performance of the computer system and generating one or more event signals indicative of the events;
   receiving the one or more event signals by a performance monitor circuit integrated within the processor core;
   within the processor core, responsive to the receiving the one of more event signals by the performance monitor circuit, a control logic circuit of the performance monitor circuit generating an increment signal and providing the increment signal to a saturating counter circuit of the performance monitor circuit to cause the saturating counter circuit to increment in response to the one or more event signals being asserted;
   at first predetermined periods, clocking a periodic counter circuit within the performance monitor circuit that times a second predetermined period so that the second predetermined period has a duration greater than the first predetermined period;

the periodic counter circuit generating a decrement signal when a count value of the periodic counter circuit has reached a count indicating the second predetermined period has elapsed;

providing the decrement signal to a decrement input of the saturating counter circuit to cause the saturating counter circuit to decrement when the second predetermined period has elapsed;

reading the saturating counter circuit to obtain the count value; and computing a performance level of the processor from the count value.

2. The method of claim 1, further comprising setting the second predetermined period to a programmed value, whereby a time interval of interest with respect to the event is controlled.

3. The method of claim 1, wherein the first predetermined periods are periods of a real time clock tick signal or a processor cycle signal.

4. The method of claim 1, wherein the first predetermined periods are periods of an instruction cycle signal.

5. The method of claim 1, wherein the detecting detects multiple event types, wherein each of the event types has a corresponding saturating counter circuit forming a plurality of saturating counter circuits, wherein the reading reads multiple count values from the plurality of saturating counter circuits corresponding to the event types, and wherein the computing computes the performance level of the processor from the multiple count values.

6. The method of claim 1, further comprising periodically resetting the saturating counter circuit at third predetermined periods independent of the second predetermined period.

7. The method of claim 6, further comprising selecting an operating mode, and wherein the periodic resetting is selectively performed in response to selection of a first operating mode and not performed in response to selection of a second operating mode.

8. A processing system comprising:

a memory storing program instructions and data; and a processor core comprising a plurality of functional units having at least one output indicating the occurrence of events indicative of performance by generating one or more event signals, a performance monitor circuit having at least one input coupled to the at least one output of the plurality of functional units for receiving the one or more event signals, wherein the performance monitor circuit includes a saturating counter circuit having an increment input and a decrement input, wherein the performance monitor circuit further includes a control logic circuit having a plurality of inputs coupled to the one or more event signals and an output coupled to the increment input of the saturating counter circuit to cause the saturating counter circuit to increment in response to the one or more event signals being asserted, and wherein the performance monitor circuit further includes a periodic counter circuit that times a second predetermined period, wherein the second predetermined period has a duration greater than a first predetermined period, wherein the control logic clocks the periodic counter circuit at the first predetermined period, wherein the periodic counter circuit has an output indicating that the periodic counter circuit has reached a count indicating that the second predetermined period has elapsed and coupled to the decrement input of the saturating counter circuit to cause the saturating counter circuit to decrement if the periodic counter circuit has reached the count indicating that the second predetermined period has elapsed, whereby the count value of the saturating counter circuit provides an indication of performance of the processor.

9. The processing system of claim 8, wherein the duration of the second predetermined period is programmable, whereby a time interval of interest with respect to the event is controllable.

10. The processing system of claim 8, wherein the control logic periodically decrements the saturating counter circuit in response to a real time clock tick signal or a processor cycle signal.

11. The processing system of claim 8, wherein the control logic periodically decrements the saturating counter circuit in response to an instruction cycle signal.

12. The processing system of claim 8, wherein the at least one event signal comprises multiple event signals indicating multiple event types, wherein each of the event types has a corresponding saturating counter circuit forming a plurality of saturating counter circuits, wherein count values of the plurality of saturating counter circuits provide indications of frequency of the multiple event types, and wherein the program instructions comprise program instructions for computing an indication of performance of the processing system from the count values of the plurality of saturating counter circuits.

13. The processing system of claim 8, wherein the control logic periodically resets the saturating counter circuit at a third predetermined period independent of the second predetermined period.

14. The processing system of claim 13, wherein the control logic has a selectable operating mode, wherein the periodically resetting is selectively performed if a first operating mode of the control logic is selected, and wherein the periodically resetting is not performed if a second operating mode of the control logic is selected.

15. A processor core, comprising:

a plurality of functional units having at least one output indicating the occurrence of events indicative of performance by generating one or more event signals;

a performance monitor circuit having at least one input coupled to the at least one output of the plurality of functional units for receiving the one of more event signals, wherein the performance monitor circuit includes a saturating counter circuit having an increment input and a decrement input, wherein the performance monitor circuit further includes a control logic circuit having a plurality of inputs coupled to the one or more event signals and an output coupled to the increment input of the saturating counter circuit to cause the saturating counter circuit to increment in response to the one or more event signals being asserted, and wherein the performance monitor circuit further includes a periodic counter circuit that times a second predetermined period, wherein the second predetermined period has a duration greater than a first predetermined period, wherein the control logic clocks the periodic counter circuit at the first predetermined period, wherein the periodic counter circuit has an output indicating that the periodic counter circuit has reached a count indicating that the second predetermined period has elapsed and coupled to the decrement input of the saturating counter circuit if the periodic counter circuit has reached the count indicating that the second predetermined period has elapsed, whereby a count value of the saturating counter circuit provides an indication of performance of the processor.

16. The processor core of claim 15, wherein the duration of the second predetermined period is programmable, whereby a time interval of interest with respect to the event is controllable.

17. The processor core of claim 15, wherein the control logic periodically decrements the saturating counter circuit in response to a real time clock tick signal or a processor cycle signal.

18. The processor core of claim 15, wherein the control logic periodically decrements the saturating counter circuit in response to an instruction cycle signal.

* * * * *